United States Patent
Mulder et al.

(10) Patent No.: US 12,285,024 B2
(45) Date of Patent: Apr. 29, 2025

(54) EDIBLE CONFECTIONERY INK COMPOSITION FOR 3D-PRINTING

(71) Applicant: Bunge Loders Croklaan B.V., Wormerveer (NL)

(72) Inventors: Hendrikus Mulder, Wormerveer (NL); Helen Cornelia Smit, Wormerveer (NL); Jun Ma, Wormerveer (NL)

(73) Assignee: Bunges Loders Croklaan B.V., Wormerveer (NL)

( * ) Notice: Subject to any disclaimer, the term of this patent is extended or adjusted under 35 U.S.C. 154(b) by 559 days.

(21) Appl. No.: 17/617,962

(22) PCT Filed: Jun. 8, 2020

(86) PCT No.: PCT/EP2020/065808
§ 371 (c)(1),
(2) Date: Dec. 10, 2021

(87) PCT Pub. No.: WO2020/249506
PCT Pub. Date: Dec. 17, 2020

(65) Prior Publication Data
US 2022/0256883 A1    Aug. 18, 2022

(30) Foreign Application Priority Data
Jun. 12, 2019 (EP) .................... 19179726

(51) Int. Cl.
*A23G 3/34* (2006.01)
*A23G 1/30* (2006.01)
*A23G 3/40* (2006.01)

(52) U.S. Cl.
CPC .......... *A23G 3/343* (2013.01); *A23G 1/305* (2013.01); *A23G 3/0097* (2013.01); *A23G 3/40* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 5,439,700 A | 8/1995 | Cain et al. | |
| 9,999,236 B2 * | 6/2018 | Ball | A23G 1/54 |
| 2011/0129563 A1 | 6/2011 | Ashokan et al. | |
| 2012/0251688 A1 | 10/2012 | Zimmerman et al. | |
| 2014/0065283 A1 | 3/2014 | Fine et al. | |
| 2015/0056357 A1 | 2/2015 | Bhaggan et al. | |
| 2016/0021907 A1 | 1/2016 | Cavin et al. | |
| 2017/0164650 A1 | 6/2017 | Diaz et al. | |

FOREIGN PATENT DOCUMENTS

| | | |
|---|---|---|
| CN | 104413230 A | 3/2015 |
| CN | 104938739 A | 9/2015 |
| CN | 107006659 A | 8/2017 |
| CN | 107125406 A | 9/2017 |
| CN | 107410628 A | 12/2017 |
| CN | 109123033 A | 1/2019 |
| EP | 0462093 A1 | 12/1991 |
| EP | 1551930 A1 | 7/2005 |
| EP | 2727469 A1 | 5/2014 |
| EP | 2839750 A1 | 2/2015 |
| EP | 2937206 A1 | 10/2015 |
| GB | 1316079 A | 5/1973 |
| GB | 1441446 A | 6/1976 |
| JP | 03-043042 A | 2/1991 |
| JP | 05-336886 A | 12/1993 |
| JP | 2013-165727 A | 8/2013 |
| JP | 2018-171002 A | 11/2018 |
| WO | 2008/035968 A2 | 3/2008 |
| WO | 2013/068154 A1 | 5/2013 |
| WO | 2014/139966 A1 | 9/2014 |
| WO | 2015/193693 A1 | 12/2015 |
| WO | 2016/150960 A1 | 9/2016 |
| WO | 2016/168421 A1 | 10/2016 |

OTHER PUBLICATIONS

International Search Report issued in corresponding International Patent Application No. PCT/EP2020/065808 dated Jul. 6, 2020.
Written Opinion issued in corresponding International Patent Application No. PCT/EP2020/065808 dated Jul. 6, 2020.
Office Action issued in Japanese application 2021-573238 dated Jan. 22, 2024.
Office Action issued in Chinese application 202080036317.4 dated Nov. 30, 2023.
Haynes, ed. CRC Handbook of Chemistry and Physics, 96th edition, 'Composition and Properties of Common Oils and Fats' at 7-15, CRC Press LLC, 2016.
Hershey's and 3D systems jointly developed 3D printer specifically for chocolate "Coco Jet", 3D printer, online citation (2016).

* cited by examiner

*Primary Examiner* — Lien T Tran
(74) *Attorney, Agent, or Firm* — Morgan, Lewis & Bockius LLP

(57) ABSTRACT

An edible confectionery ink composition for 3D printing comprises: from 20% to 75% by weight of sweetener, preferably sugar, and from 15% to 50% by weight of a fat composition, wherein the fat composition comprises from 0% to 3% by weight of lauric acid (C12:0); and from 35% to 70% by weight of saturated fatty acid (SAFA); said percentages of acid referring to acids bound as acyl groups in glycerides in the fat composition and being based on the total weight of C8 to C24 fatty acids; and a percentage of saturated fatty acid on the second position of triglyceride out of total saturated fatty acid (Sn-2 SAFA %) from 8.0% to 40.0%; and wherein the fat composition has; from 50 to 90 solid fat content at 10° C.; and from 30 to 75 solid fat content at 20° C.; and from 5 to 30 solid fat content at 30° C.; measured on unstabilized fat according to ISO 8292-1.

9 Claims, No Drawings

EDIBLE CONFECTIONERY INK COMPOSITION FOR 3D-PRINTING

This invention relates to an edible confectionery ink composition for 3D-printing, the use thereof, a 3D-printed confectionery product and a method for making an edible confectionery ink composition for 3D-printing.

BACKGROUND

Customized food products have become more and more popular, such as personalized chocolate bars or chocolate-like confectionery products. Since customized food products are often required in a limited quantity, the production cost of these products is relatively high for a food manufacturer if these products are produced in traditional ways such as by molding or by skilled artisans.

3D food printing provides a potential solution to improve the efficiencies to produce custom-designed food products while the product cost could be reduced to an acceptable and accessible level for consumers.

3D food printing techniques include inkjet printing, powder binding deposition and fused deposition modelling (FDM). Inkjet printing technology employs a thermal or piezoelectric head to generate the pressure necessary to push droplets out of the nozzle. Powder binding deposition includes selective laser sintering, selective hot air sintering and melting and liquid binding. The application of FDM is commonly seen in printing soft-materials like purees, as well as molten chocolate and hydrogel-forming materials. The food ink is loaded in an extruder/syringe. Using a printing head having movements that are digitally controlled, the ink is deposited onto a platform as the result of a force exerted by a piston.

EP A1 0 462 093 relates to a method for preparing confectionery products printed with edible ink, in particular printed chocolate and an ink to be used therein, which contains at least a solvent, a suspended pigment, a sugar and a surfactant and preferably also a lipophilic substance and an emulsifier.

WO 2014/139966 relates to processes for printing with edible inks and printing an edible ink onto a material using an inkjet printing device. The material may be an edible material. The ink may comprise a colorant, at least 30% water, at least 25% carbohydrate sweeteners and be free from both diols and triols.

WO 2013/068154 relates to a process for producing a decorated coated frozen confection product, the process comprising the steps of: applying a layer of a coating material to a frozen confection; and ink-jet printing a fat-based ink onto the coated frozen confection to form a pattern; wherein the fat-base of the ink is a fat or blend of fats having N10 values of at least 70.

EP A1 1 551 930 discloses high resolution ink jet printing on edible substrates in which fat or wax-based edible inks, which contain a colorant, a fat or wax dispersible carrier, and a fat or wax base, are used to produce high resolution images on edible products. The methods utilize a piezoelectric print head; and the edible products include confectionery pieces having non-planar, hydrophobic surfaces, such as wax-polished sugar shell surfaces, with a printed image thereon having a resolution greater than 100 dpi, preferably greater than 300 dpi.

GB 1441446A relates to methods of decorating confectionery by applying an edible ink composition thereto.

WO 2016/150960 relates to food compositions which contain specific texturing agents and to the use of said food compositions in a 3D printing process.

WO 2016/168421 discloses an edible material made of liquid, sugar, and one or more hydrocolloids. The edible material may be used to form edible cups, containers, and the like, may be capable of holding hot or cold liquids for extended periods of time, and have an extended shelf life. The composition forming the edible material may further be suitable for 3D printing edible applications.

EP A1 2 727 469 relates to a method for printing a three-dimensional crystalline structure such as a chocolate layer wherein, after printing, the material has a desired crystal structure.

EP A1 2 937 206 describes a method for printing a three-dimensional crystalline structure such as a chocolate layer wherein, after printing, the material has a desired crystal structure and a plurality of non-random cavities.

CN 107410628A discloses 3D-printing quick-shaping fondant food materials. The fondant food materials comprise the following raw materials in percentage by mass: 25%-30% of candyfloss, 55%-60% of icing, 6%-10% of butter, 4%-6% of corn syrup, 0.5%-1% of tylose powder and 1.5%-3% of white oil.

There remains a need to provide an edible confectionery ink composition which is suitable for a 3D-printing process and to obtain a printed product with improved stable structure and desirable appearance properties. There also remains a need to provide a feasible and efficient 3D printing method with a suitable edible ink to print a three-dimensional edible confectionery object.

DESCRIPTION OF THE INVENTION

According to the present invention, there is provided an edible confectionery ink composition for 3D printing comprising from 20% to 75% by weight of sweetener and from 15% to 50% by weight of a fat composition, wherein the fat composition comprises from 0% to 3% by weight of lauric acid (C12:0); and from 35% to 70% by weight of saturated fatty acid (SAFA); said percentages of acids referring to acids bound as acyl groups in glycerides in the fat composition and being based on the total weight of C8 to C24 fatty acids; and a percentage of saturated fatty acid on the second position of triglyceride out of total saturated fatty acid (Sn-2 SAFA %) from 8.0% to 40.0%; and wherein the fat composition has: from 50 to 90 solid fat content at 10° C.; and from 30 to 75 solid fat content at 20° C.; and from 5 to 30 solid fat content at 30° C.; measured on unstabilized fat according to ISO 8292-1.

The edible confectionery ink of this invention has been found to be particularly useful for 3D food printing. An edible confectionery ink according to the invention has a good texture and viscosity before printing so that the ink can be smoothly extruded out of a nozzle. After deposition on a platform, the ink is still able to maintain an outstandingly stable and rigid structure that easily allows further processing and/or packaging. The printed object is also relatively close to the predetermined design. In particular, the ink according to the invention surprisingly provides good appearance properties in a 3D printed product.

The term "3D printing" refers to an automated process in which material is connected or solidified to produce a predetermined three-dimensional object with material being added together, layer by layer.

The term "edible" refers to something suitable for use as food or as part of a food product, such as a confectionery product.

The term "confectionery" refers to an edible food product comprising sweetener, such as sweets (candy) and chocolates.

The term "ink composition" refers to a fluid paste material prepared by mixing ingredients, ready to be used for 3D printing and solidifying properly after printing to form a predesigned 3D object. The term "ink" refers to the context of use in 3D printing and does not necessarily imply the presence of a colouring agent (e.g., a dye) or colour, although the ink compositions may have a colour and may contain a colouring agent.

The term "sweetener" refers to a substance that is added to food to provide a sweet taste and is well-known in the art. Sweeteners include sucrose (also generally referred to as 'sugar' and which may be provided in refined or unrefined form), glucose, fructose, syrups such as corn syrup and high fructose corn syrup, honey, polyols including erythritol, maltitol, mannitol, sorbitol, lactitol, xylitol, isomalt, propylene glycol, glycerol (glycerin), threitol, galactitol and palatinose, sucralose, potassium acesulfame, acesulfame acid and salts thereof, aspartame, alitame, neotame, advantame, cyclamate, saccharin and salts thereof, neohesperidin, steviol glucosides, fruit extract and combinations thereof. Those skilled in the art will be able to adjust the amount of sweetener, or combination of sweeteners, to achieve a desired degree of sweetness. Preferred sweeteners are sucrose, glucose, fructose, syrups such as corn syrup and high fructose corn syrup. A particularly preferred sweetener is sucrose.

The term "fat" refers to glyceride fats and oils containing fatty acid acyl groups and does not imply any particular melting point. The term "oil" is used synonymously with "fat".

The term "fatty acid", as used herein, refers to straight chain saturated or unsaturated (including mono- and poly unsaturated) carboxylic acids having from 8 to 24 carbon atoms. The term "fatty acid" encompasses free fatty acids and fatty acid residues in glycerides. A fatty acid having x carbon atoms and y double bonds may be denoted Cx:y. For example, palmitic acid may be denoted C16:0 and oleic acid may be denoted C18:1. Percentages of fatty acids in compositions referred to herein include acyl groups in tri-, di- and mono-glycerides present in the glycerides and are based on the total weight of C8 to C24 fatty acids. The fatty acid profile (i.e., composition) may be determined, for example, by fatty acid methyl ester analysis (FAME) using gas chromatography according to ISO 12966-2 and ISO 12966-4.

The fat composition of the edible confectionery ink composition according to the invention may be made from naturally occurring or synthetic fats, fractions of naturally occurring or synthetic fats, or mixtures thereof, that satisfy the requirements for fatty acids and solid fat contents defined herein. Preferably, the fat composition is, or is derived from, one or more vegetable fats, optionally interesterified.

The ink composition of the invention comprises from 20% to 75% by weight of sweetener, preferably from 25% to 70% by weight, more preferably from 35% to 60% by weight and even more preferably from 43% to 55% by weight.

The ink composition of the invention further comprises from 15% to 50% by weight of the fat composition, preferably from 20% to 45% by weight, more preferably from 25% to 40% by weight, and even more preferably from 25% to 34% by weight.

Accordingly, a preferred ink composition of the invention comprises from 25% to 70% by weight of sweetener and from 20% to 45% by weight of the fat composition. A more preferred ink composition of the invention comprises from 35% to 60% by weight of sweetener and from 25% to 40% by weight of the fat composition. An even more preferred ink composition of the invention comprises from 43% to 55% by weight of sweetener and from 25% to 34% by weight of the fat composition.

An even more preferred ink composition of the invention comprises from 25% to 70% by weight of sugar and from 20% to 45% by weight of the fat composition. A more preferred ink composition of the invention comprises from 35% to 60% by weight of sugar and from 25% to 40% by weight of the fat composition. An even more preferred ink composition of the invention comprises from 43% to 55% by weight of sugar and from 25% to 34% by weight of the fat composition.

Amounts of triglycerides specified herein are percentages by weight based on total triglycerides present in the fat composition. The notation triglyceride XYZ denotes triglycerides having fatty acid acyl groups X, Y and Z at any of the 1-, 2- and 3-positions of the glyceride. The notation A2B includes both AAB and ABA, and AB2 includes both ABB and BAB. Triglyceride content may be determined for example by GC (ISO 23275).

The fat composition of an ink composition according to the invention preferably comprises from 5% to 18% by weight of combined PPP, PPSt, PStSt and StStSt triglycerides; and from 40% to 60% by weight of combined POP, POSt and StOSt triglycerides; based on total triglycerides present in the composition, wherein P is palmitic acid, O is oleic acid and St is stearic acid.

More preferably, the fat composition of an ink composition according to the invention preferably comprises from 6% to 16% by weight of combined PPP, PPSt, PStSt and StStSt triglycerides; and from 43% to 58% by weight of combined POP, POSt and StOSt triglycerides; based on total triglycerides present in the composition, wherein P is palmitic acid, O is oleic acid and St is stearic acid.

Even more preferably, the fat composition of an ink composition according to the invention preferably comprises from 6% to 14% by weight of combined PPP, PPSt, PStSt and StStSt triglycerides; and from 45% to 56% by weight of combined POP, POSt and StOSt triglycerides; based on total triglycerides present in the composition, wherein P is palmitic acid, O is oleic acid and St is stearic acid.

The fat composition of an ink composition according to the invention preferably has a weight ratio of (PPP+PPSt+PStSt+StStSt):(POP+POSt+StOSt) triglycerides of from 0.08 to 0.45, more preferably from 0.09 to 0.40, even more preferably from 0.10 to 0.35; based on total triglycerides present in the composition, wherein P is palmitic acid, O is oleic acid and St is stearic acid.

The fat composition of an ink composition according to the invention comprises from 0% to 3% by weight of lauric acid (C12:0), preferably from 0% to 2% by weight, more preferably from 0.1% to 1% by weight; said percentages of acid referring to acids bound as acyl groups in glycerides in the fat composition and being based on the total weight of C8 to C24 fatty acids.

The saturated fatty acid (SAFA) of the fat composition of an ink composition according to the invention is from 35% to 70%, preferably from 40% to 65%, more preferably from 45% to 60%, even more preferably from 50% to 60%; said percentages of acid referring to acids bound as acyl groups in glycerides in the fat composition and being based on the total weight of C8 to C24 fatty acids.

The fat composition of an ink composition according to the invention has a percentage of saturated fatty acid on the second position of triglyceride out of total saturated fatty acid (Sn-2 SAFA %) from 8.0% to 40.0%, preferably from 9.0% to 38.0%, more preferably from 10.0% to 34.0% and even more preferably from 11.0% to 25.0%.

Accordingly, the fat composition of an ink composition according to the invention preferably comprises from 0% to 2% by weight of lauric acid (C12:0) and from 40% to 65% by weight of saturated fatty acid (SAFA); said percentages of acid referring to acids bound as acyl groups in glycerides in the fat composition and being based on the total weight of C8 to C24 fatty acids and a percentage of saturated fatty acid on the second position of triglyceride out of total saturated fatty acid (Sn-2 SAFA %) from 9.0% to 38.0. The fat composition of an ink composition according to the invention more preferably comprises from 0% to 1% by weight of lauric acid (C12:0) and from 45% to 60% by weight of saturated fatty acid (SAFA); said percentages of acid referring to acids bound as acyl groups in glycerides in the fat composition and being based on the total weight of C8 to C24 fatty acids; and a percentage of saturated fatty acid on the second position of triglyceride out of total saturated fatty acid (Sn-2 SAFA %) from 10.0% to 34.0%.

In a preferred embodiment, the fat composition of an ink composition according to the invention comprises from 0% to 2% by weight of lauric acid (C12:0); and from 40% to 65% by weight of saturated fatty acid (SAFA); said percentages of acid referring to acids bound as acyl groups in glycerides in the fat composition and being based on the total weight of C8 to C24 fatty acids; a percentage of saturated fatty acid on the second position of triglyceride out of total saturated fatty acid (Sn-2 SAFA %) from 9.0% to 38.0%; and from 5% to 18% by weight of combined PPP, PPSt, PStSt and StStSt triglycerides; and from 40% to 60% y weight of combined POP, POSt and StOSt triglycerides; and a weight ratio of (PPP+PPSt+PStSt+StStSt):(POP+POSt+StOSt) triglycerides of from 0.08 to 0.45; based on total triglycerides present in the composition, wherein P is palmitic acid, 0 is oleic acid and St is stearic acid.

In a more preferred embodiment, the fat composition of an ink composition according to the invention comprises from 0.1% to 1% by weight of lauric acid (C12:0); and from 45% to 60% by weight of saturated fatty acid (SAFA); said percentages of acid referring to acids bound as acyl groups in glycerides in the fat composition and being based on the total weight of C8 to C24 fatty acids; a percentage of saturated fatty acid on the second position of triglyceride out of total saturated fatty acid (Sn-2 SAFA %) from 10.0% to 34.0%; and from 6% to 16% by weight of combined PPP, PPSt, PStSt and StStSt triglycerides; and from 45% to 58% by weight of combined POP, POSt and StOSt triglycerides; and a weight ratio of (PPP+PPSt+PStSt+StStSt):(POP+POSt+StOSt) triglycerides of from 0.09 to 0.40; based on total triglycerides present in the composition, wherein P is palmitic acid, 0 is oleic acid and St is stearic acid.

The fat composition of an ink composition according to the invention has from 50 to 90 solid fat content at 10° C.; and from 30 to 75 solid fat content at 20° C.; and from 5 to 30 solid fat content at 30° C.; measured on unstabilized fat according to ISO 8292-1.

Preferably, the fat composition of an ink composition of the invention has from 55 to 85 solid fat content at 10° C., more preferably from 60 to 80; measured on unstabilized fat according to ISO 8292-1.

Preferably, the fat composition of an ink composition of the invention has from 40 to 80 solid fat content at 15° C., more preferably from 45 to 75; measured on unstabilized fat according to ISO 8292-1.

Preferably, the fat composition of an ink composition of the invention has from 35 to 65 solid fat content at 20° C., more preferably from 40 to 60; measured on unstabilized fat according to ISO 8292-1.

Preferably, the fat composition of an ink composition of the invention has from 20 to 45 solid fat content at 25° C., more preferably from 25 to 40; measured on unstabilized fat according to ISO 8292-1.

Preferably, the fat composition of an ink composition of the invention has from 6 to 25 solid fat content at 30° C., more preferably from 7 to 20; measured on unstabilized fat according to ISO 8292-1.

Preferably, the fat composition of an ink composition of the invention has from 2 to 18 solid fat content at 35° C., more preferably from 3 to 15; measured on unstabilized fat according to ISO 8292-1.

In a preferred embodiment, the fat composition of an ink composition of the invention has from 55 to 85 solid fat content at 10° C.; and from 40 to 80 solid fat content at 15° C.; and from 35 to 65 solid fat content at 20° C.; and from 20 to 45 solid fat content at 25° C.; and from 6 to 25 solid fat content at 30° C.; and from 2 to 18 solid fat content at 35° C.; measured on unstabilized fat according to ISO 8292-1.

In a more preferred embodiment, the fat composition of an ink composition of the invention has from 60 to 80 solid fat content at 10° C.; and from 45 to 75 solid fat content at 15° C.; and from 40 to 60 solid fat content at 20° C.; and from 25 to 40 solid fat content at 25° C.; and from 7 to 20 solid fat content at 30° C.; and from 3 to 15 solid fat content at 35° C.; measured on unstabilized fat according to ISO 8292-1.

It is believed that the edible ink compositions have particularly desired rheological properties to be extruded out of a nozzle smoothly and controllably during printing and be deposited on a platform when the fat composition of the ink compositions has a solid fat content at 30° C. and/or at 35° C. within the preferred ranges.

It is also believed that the edible ink compositions provide a particularly stable and rigid structure of 3D printed product after being deposited on a platform when the fat composition of the ink compositions has a solid fat content at 20° C. and/or at 25° C. within the preferred ranges.

Palm oil may be fractionated to separate various fractions depending on the melting behavior of the fractions. As well known in the art, in general, palm stearin may be considered as a hard fraction of palm oil and palm olein may be considered as a soft fraction of palm oil. Palm mid fraction is a fraction between palm stearin and palm olein. To identify the different fractions, iodine value can be measured to indicate each fraction of palm oil. The term "iodine value" refers to the number of grams of iodine that could be added to 100 g of oil, which can be measured by a standard method, such as AOCS Method Cd 1-25.

In a preferred embodiment, the fat composition of an ink composition according to the invention comprises a palm mid fraction with an iodine value from 40 to 45. In a more preferred embodiment, the fat composition of an ink composition according to the invention comprises from 10% to 70% by weight of a palm mid fraction with an iodine value from 40 to 45. In an even more preferred embodiment, the fat composition of an ink composition according to the invention comprises from 15% to 55% by weight of a palm mid fraction with an iodine value from 40 to 45.

In another preferred aspect, the fat composition of an ink composition according to the invention consists of 30% to 90% by weight of palm olein fraction with an iodine value from 46 to 50 and from 10% to 70% by weight of palm mid fraction with an iodine value from 40 to 45.

In another more preferred aspect, the fat composition of an ink composition according to the invention consists of 40% to 85% by weight of palm olein fraction with an iodine value from 46 to 50 and from 15% to 60% by weight of palm mid fraction with an iodine value from 40 to 45.

In another even more preferred aspect, the fat composition of an ink composition according to the invention consists of 40% to 85% by weight of palm olein fraction with an iodine value from 46 to 50 and from 15% to 60% by weight of palm mid fraction with an iodine value from 40 to 45, wherein the palm olein fraction is interesterified. Interesterification may be carried out chemically or enzymatically. Chemical interesterification may be performed, for example, by using sodium methoxide as catalyst. Enzymatic interesterification may be for instance catalyzed by lipase.

In another preferred aspect, the fat composition of an ink composition according to the invention consists of 30% to 70% by weight of interesterified palm olein fraction with an iodine value from 52 to 57 and 30% to 70% by weight of shea stearin. Shea stearin is a stearin fraction obtained from shea butter. More preferably, the fat composition of an ink composition according to the invention consists of 40% to 60% by weight of interesterified palm olein fraction with an iodine value from 52 to 57 and 40% to 60% by weight of shea stearin.

The edible confectionery ink composition according to the invention preferably comprises further one or more optional ingredients selected from cocoa powder, milk powder, vegetable milk powder, dairy powder, yoghurt powder, cocoa mass, vanillin, emulsifier, colorant and flavoring.

The edible confectionery ink composition according to the invention preferably comprises from 5% to 25% by weight of cocoa powder, more preferably from 6% to 20% by weight.

In another preferred aspect, the edible confectionery ink composition according to the invention comprises from 0.1% to 1% by weight of colorant, more preferably from 0.1% to 0.5% by weight.

The term "emulsifier" refers to a substance kinetically increasing the stability of an emulsion, for example, lecithin, polyglycerol polyricinoleate (PGPR), sorbitan tristearate, sorbitan monostearate, mono- and diglycerides, distilled monoglycerides and propylene glycol esters of fatty acids.

Further provided by the invention is a method for making an edible confectionery ink composition suitable for 3D printing, comprising the steps of: a) providing a fat composition as defined above; b) melting completely the fat composition provided in step a); c) blending sweetener, preferably sugar, and optionally one or more ingredients selected from cocoa powder, milk powder, vegetable milk powder, dairy powder, yoghurt powder, cocoa mass, vanillin, emulsifier, colorant, and flavoring, with the melted liquid fat composition from step b), where the blend comprises from 20% to 75% by weight of sweeteners and from 15% to 50% by weight of the fat composition from steps a) and b); d) mixing the blend obtained from step c) at a temperature of from 50° C. to 65° C.; e) cooling the mixture obtained from step d) to a temperature of from 28° C. to 40° C., wherein the ink composition is fluid. The ink composition is fluid at the end of the method at the temperature of 28° C. to 40° C. such that it can be used in 3D printing.

The invention also relates to the use of an edible confectionery ink composition according to the invention for 3D printing.

The invention also relates to a method for printing a 3D edible confectionery product, comprising the steps of: a) providing a fat composition, wherein the fat composition comprises: from 0% to 3% by weight of lauric acid (C12:0); and from 35% to 70% by weight of saturated fatty acid (SAFA); said percentages of acid referring to acids bound as acyl groups in glycerides in the fat composition and being based on the total weight of C8 to C24 fatty acids; and a percentage of saturated fatty acid on the second position of triglyceride out of total saturated fatty acid from 8.0% to 40.0%; and wherein the fat composition has: from 50 to 90 solid fat content at 10° C.; and from 30 to 75 solid fat content at 20° C.; and from 5 to 30 solid fat content at 30° C.; measured on unstabilized fat according to ISO 8292-1; b) melting completely the fat composition provided in step a); c) blending sugar or other sweetener and optionally one or more ingredients selected from cocoa powder, milk powder, vegetable milk powder, dairy powder, yoghurt powder, cocoa mass, vanillin, emulsifier, colorant, and flavoring, with the melted liquid fat composition from step b), where the blend comprises from 20% to 75% by weight of sweeteners and from 15% to 50% by weight of the fat composition from steps a) and b); d) mixing the blend obtained from step c) at a temperature of from 50° C. to 65° C.; e) cooling the ink obtained from step d) to a temperature of from 27° C. to 40° C., wherein the ink is fluid; f) depositing the fluid ink according to a predetermined three-dimensional pattern comprising multiple layers; and g) solidifying the fluid ink on a platform at a solidifying temperature.

The term "solidifying temperature" refers to a temperature at which the ink composition solidifies on a platform. The solidifying temperature for an edible composition ink is in general from 15° C. to 28° C., preferably from 18° C. to 25° C.

Preferably, the fat composition provided in step a) of the method according to the invention has from 0% to 2% by weight of lauric acid (C12:0) and from 40% to 65% by weight of saturated fatty acid (SAFA); said percentages of acid referring to acids bound as acyl groups in glycerides in the fat composition and being based on the total weight of C8 to C24 fatty acids; and a percentage of saturated fatty acid on the second position of triglyceride out of total saturated fatty acid from 9.0% to 38.0%.

More preferably, the fat composition provided in step a) of the method according to the invention has from 0.1% to 1% by weight of lauric acid (C12:0) and from 45% to 60% by weight of saturated fatty acid (SAFA); said percentages of acid referring to acids bound as acyl groups in glycerides in the fat composition and being based on the total weight of C8 to C24 fatty acids; and a percentage of saturated fatty acid on the second position of triglyceride out of total saturated fatty acid from 10.0% to 34.0%.

Preferably, the fat composition provided in step a) of the method according to the invention has from 55 to 85 solid fat content at 10° C.; measured on unstabilized fat according to ISO 8292-1. More preferably, the fat composition provided in step a) of the method according to the invention has from 60 to 80 solid fat content at 10° C.; measured on unstabilized fat according to ISO 8292-1.

Preferably, the fat composition provided in step a) of the method according to the invention has from 40 to 80 solid fat content at 15° C.; measured on unstabilized fat according to ISO 8292-1. More preferably, the fat composition provided in step a) of the method according to the invention has from 45 to 75 solid fat content at 15° C.; measured on unstabilized fat according to ISO 8292-1.

Preferably, the fat composition provided in step a) of the method according to the invention has from 35 to 65 solid fat content at 20° C.; measured on unstabilized fat according to ISO 8292-1. More preferably, the fat composition provided in step a) of the method according to the invention has from 40 to 60 solid fat content at 20° C.; measured on unstabilized fat according to ISO 8292-1.

Preferably, the fat composition provided in step a) of the method according to the invention has from 20 to 45 solid fat content at 25° C.; measured on unstabilized fat according to ISO 8292-1. More preferably, the fat composition provided in step a) of the method according to the invention has from 25 to 40 solid fat content at 25° C.; measured on unstabilized fat according to ISO 8292-1.

Preferably, the fat composition provided in step a) of the method according to the invention has from 6 to 25 solid fat content at 30° C.; measured on unstabilized fat according to ISO 8292-1. More preferably, the fat composition provided in step a) of the method according to the invention has from 7 to 20 solid fat content at 30° C.; measured on unstabilized fat according to ISO 8292-1.

Preferably, the fat composition provided in step a) of the method according to the invention has from 2 to 18 solid fat content at 35° C.; measured on unstabilized fat according to ISO 8292-1. More preferably, the fat composition provided in step a) of the method according to the invention has from 3 to 15 solid fat content at 35° C.; measured on unstabilized fat according to ISO 8292-1.

In a preferred embodiment, the fat composition provided in step a) of the method according to the invention has from 55 to 85 solid fat content at 10° C.; and from 40 to 80 solid fat content at 15° C.; and from 35 to 65 solid fat content at 20° C.; and from 20 to 45 solid fat content at 25° C.; and from 6 to 25 solid fat content at 30° C.; and from 2 to 18 solid fat content at 35° C.; measured on unstabilized fat according to ISO 8292-1.

In a more preferred embodiment, the fat composition provided in step a) of the method according to the invention has from 60 to 80 solid fat content at 10° C.; and from 45 to 75 solid fat content at 15° C.; and from 40 to 60 solid fat content at 20° C.; and from 25 to 40 solid fat content at 25° C.; and from 7 to 20 solid fat content at 30° C.; and from 3 to 15 solid fat content at 35° C.; measured on unstabilized fat according to ISO 8292-1.

The blend obtained from step c) according to the method is mixed preferably at a temperature of from 52° C. to 62° C. in step d), more preferably at a temperature of from 53° C. to 58° C.

The mixture obtained from step d) according to the method is cooled preferably to a temperature of from 27° C. to 37° C., more preferably to a temperature of from 29° C. to 36° C., even more preferably to a temperature of from 30° C. to 35° C.

In a preferred embodiment, the method for printing a 3D edible confectionery product according to the invention comprises the steps of: a) providing a fat composition, wherein the fat composition comprises: from 0% to 2% by weight of lauric acid (C12:0) and from 40% to 65% by weight of saturated fatty acid (SAFA); said percentages of acid referring to acids bound as acyl groups in glycerides in the fat composition and being based on the total weight of C8 to C24 fatty acids; and a percentage of saturated fatty acid on the second position of triglyceride out of total saturated fatty acid from 9.0% to 38.0%; and wherein the fat composition has: from 55 to 85 solid fat content at 10° C.; and from 40 to 80 solid fat content at 15° C.; and from 35 to 65 solid fat content at 20° C.; and from 20 to 45 solid fat content at 25° C.; and from 6 to 25 solid fat content at 30° C.; and from 2 to 18 solid fat content at 35° C.; measured on unstabilized fat according to ISO 8292-1; b) melting completely the fat composition provided in step a); c) blending sugar and optionally other sweetener and/or one or more ingredients selected from cocoa powder, milk powder, vegetable milk powder, dairy powder, yoghurt powder, cocoa mass, vanillin, emulsifier, colorant, and flavoring, with the melted liquid fat composition from step b), where the blend comprises from 25% to 70% by weight of sweetener and from 20% to 45% by weight of the fat composition from steps a) and b); d) mixing the blend obtained from step c) at a temperature of from 52° C. to 62° C.; e) cooling the ink obtained from step d) to a temperature of from 27° C. to 37° C., wherein the ink is fluid; f) depositing the fluid ink according to a predetermined three-dimensional pattern comprising multiple layers; and g) solidifying the fluid ink on a platform at a solidifying temperature.

In a more preferred embodiment, the method for printing a 3D edible confectionery product according to the invention comprises the steps of: a) providing a fat composition, wherein the fat composition comprises: from 0.1% to 1% by weight of lauric acid (C12:0) and from 45% to 60% by weight of saturated fatty acid (SAFA); said percentages of acid referring to acids bound as acyl groups in glycerides in the fat composition and being based on the total weight of C8 to C24 fatty acids; and a percentage of saturated fatty acid on the second position of triglyceride out of total saturated fatty acid from 10.0% to 34.0%; and wherein the fat composition has: from 60 to 80 solid fat content at 10° C.; and from 45 to 75 solid fat content at 15° C.; and from 40 to 60 solid fat content at 20° C.; and from 25 to 40 solid fat content at 25° C.; and from 7 to 20 solid fat content at 30° C.; and from 3 to 15 solid fat content at 35° C.; measured on unstabilized fat according to ISO 8292-1; b) melting completely the fat composition provided in step a); c) blending sugar and optionally other sweetener and optionally one or more ingredients selected from cocoa powder, milk powder, vegetable milk powder, dairy powder, yoghurt powder, cocoa mass, vanillin, emulsifier, colorant, and flavoring, with the melted liquid fat composition from step b), where the blend comprises from 35% to 60% by weight of sweetener and from 25% to 40% by weight of the fat composition from steps a) and b); d) mixing the blend obtained from step c) at a temperature of from 53° C. to 58° C.; e) cooling the ink obtained from step d) to a temperature of from 29° C. to 36° C., wherein the ink is fluid; f) depositing the fluid ink according to a predetermined three-dimensional pattern comprising multiple layers; and g) solidifying the fluid ink on a platform at a solidifying temperature.

The invention also relates to a 3D printed confectionery product obtained from, or obtainable from, the edible confectionery ink composition according to the invention.

The invention also relates to the use of a 3D printed confectionery product obtained from, or obtainable from, the edible confectionery ink composition according to the invention in an edible product.

The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention.

The following non-limiting examples illustrate the invention and do not limit its scope in any way.

In the examples and throughout this specification, all percentages, parts and ratios are by weight unless indicated otherwise.

EXAMPLES

Example 1—Fat Compositions

Three fat compositions were prepared. Each fat composition was bleached and deodorized.

Palm oil is dry fractionated to separate a stearin fraction with an iodine value about 35 (POsIV35) from an olein fraction with an iodine value about 55 (POfIV55). The stearin fraction (POsIV35) is further dry fractionated to separate a stearin fraction (POsIV14) from an olein fraction (POfIV47). The olein fraction (POfIV55) is further dry fractionated to separate a soft mid fraction (POmIV42) from an olein fraction (POfIV64). POmIV42 is further solvent fractionated to separate a hard mid fraction (POmIV32) from an olein fraction. Iodine value can be measured with the AOCS Method Cd 1-25.

Fat 1 is a blend of 84% by weight of POfIV47 and 16% by weight of POmIV42.

Fat 2 is a blend of 50% by weight of chemically interesterified POfIV47 and 50% by weight of POmIV42.

Fat 3 is a blend of 50% by weight of enzymatic interesterified POfIV55 and 50% by weight of shea stearin. Shea stearin is obtained from shea butter by means of solvent fractionation.

Two comparative fat compositions were prepared. Each fat composition was bleached and deodorized.

Comparative Fat 1 is 100% by weight of shea butter.

Comparative Fat 2 is 99% by weight of POmIV32 and 1% by weight of solvent fractionated top stearin fraction of chemically interesterified POsIV35.

The analytical results of Fat 1, Fat 2, Fat 3, Comparative Fat 1 and Comparative Fat 2 are shown in Table 1.

TABLE 1

Analytical results of Fat 1, Fat 2, Fat 3, Comparative Fat 1 and Comparative Fat 2

| | Fat 1 | Fat 2 | Fat 3 | Comparative Fat 1 | Comparative Fat 2 |
|---|---|---|---|---|---|
| US-N10 | 69 | 77 | 66 | 49 | 94 |
| US-N15 | 58 | 67 | 58 | 39 | 91 |
| US-N20 | 43 | 52 | 45 | 26 | 81 |
| US-N25 | 26 | 32 | 28 | 12 | 49 |
| US-N30 | 16 | 18 | 7 | 5 | 10 |
| US-N35 | 10 | 10 | 3 | 3 | 2 |
| US-N40 | 5 | 5 | 0 | 1 | 0 |
| C8:0 | 0.0 | 0.0 | 0.0 | 0.0 | 0.0 |
| C10:0 | 0.0 | 0.0 | 0.0 | 0.0 | 0.0 |
| C12:0 | 0.3 | 0.3 | 0.3 | 0.1 | 0.2 |
| C14:0 | 1.2 | 1.2 | 0.6 | 0.1 | 0.9 |
| C16:0 | 50.1 | 50.9 | 21.6 | 5.2 | 56.8 |
| C18:0 | 5.5 | 5.3 | 31.7 | 43.7 | 5.9 |
| C18:1 | 34.3 | 34.4 | 36.9 | 42.9 | 32.2 |
| C18:2 | 7.5 | 6.9 | 7.1 | 5.8 | 3.2 |
| C18:3 | 0.2 | 0.1 | 0.2 | 0.2 | 0.0 |
| C20:0 | 0.4 | 0.4 | 1.1 | 1.4 | 0.5 |
| SAFA | 57.7 | 58.3 | 55.6 | 50.9 | 64.6 |
| MUFA | 34.6 | 34.6 | 37.1 | 43.2 | 32.2 |
| PUFA | 7.6 | 7.0 | 7.3 | 6.0 | 3.2 |
| IV FAME | 43.2 | 42.0 | 44.6 | 47.6 | 33.3 |
| PPP | 8.7 | 8.7 | 4.0 | 0.0 | 4.2 |
| PPSt | 2.9 | 2.3 | 1.1 | 0.4 | 0.9 |
| POP | 38.2 | 41.1 | 10.9 | 1.8 | 65.0 |
| PStSt | 0.4 | 0.3 | 0.4 | 0.3 | 0.1 |
| POSt | 6.7 | 7.3 | 6.0 | 5.0 | 12.1 |
| POO | 14.7 | 13.4 | 10.2 | 2.9 | 3.2 |
| StStSt | 0.1 | 0.1 | 1.1 | 1.9 | 0.0 |
| StOSt | 1.9 | 1.5 | 38.2 | 41.7 | 2.2 |
| StOO | 1.6 | 1.2 | 3.1 | 24.2 | 0.4 |
| OOO | 2.1 | 2.1 | 3.2 | 4.5 | 0.1 |
| PPP + PPSt + PStSt + StStSt | 12.1 | 11.4 | 6.6 | 2.6 | 5.2 |
| POP + POSt + StOSt | 46.8 | 49.9 | 55.1 | 48.5 | 79.3 |
| (PPP + PPSt + PStSt + StStSt)/(POP + POSt + StOSt) | 0.26 | 0.23 | 0.12 | 0.05 | 0.07 |

In the above table:

Cx:y refers to a fatty acid having x carbon atoms and y double bonds; levels determined by GC-FAME (ISO 12966-2 and ISO 12966-4);

IVFAME refers to calculated iodine value according to AOCS Cd 1c-85;

SAFA refers to saturated fatty acids;

MUFA refers to monounsaturated fatty acids;

PUFA refers to polyunsaturated fatty acids;

US-Nx refers to solid fat content determined by NMR on unstabilised fat at x° C. (ISO 8292-1); O, P, St, L and A refer to oleic, palmitic, stearic, linoleic and arachidic acids, respectively;

Triglyceride compositions: POSt, and other triglycerides were determined by GC (ISO 23275), wherein each GC peak includes triglycerides having the same fatty acids in different positions e.g., POSt is in the same signal peak as PStO and StPO.

The method based on thin-layer chromatography (TLC) and the partial hydrolysis of triglyceride with Grignard reagent has been used to quantify the fatty acid esterified in SN-2 position of triglycerides in Fat 1, Fat 2, Fat 3, Comparative Fat 1 and Comparative Fat 2 further by GC-FAME (ISO 12966-2 and ISO 12966-4). The analytical results are shown in Table 2.

TABLE 2

Fatty acid composition on SN-2 position of Fat 1, Fat 2, Fat 3, Comparative Fat 1 and Comparative Fat 2.

| Fatty acid composition on SN-2 position | Fat 1 | Fat 2 | Fat 3 | Comparative Fat 1 | Comparative Fat 2 |
|---|---|---|---|---|---|
| C8:0 | 0.1 | 0.0 | 0.0 | 0.1 | 0.1 |
| C10:0 | 0.2 | 0.1 | 0.2 | 0.2 | 0.2 |
| C12:0 | 0.6 | 0.7 | 0.4 | 0.8 | 1.0 |
| C14:0 | 0.9 | 1.1 | 0.6 | 0.9 | 0.7 |
| C16:0 | 18.6 | 30.9 | 16.9 | 1.8 | 11.3 |
| C18:0 | 1.6 | 2.9 | 3.8 | 6.0 | 0.9 |
| C18:1 | 62.1 | 52.8 | 66.0 | 75.6 | 76.2 |
| C18:2 | 14.3 | 10.0 | 10.7 | 13.0 | 8.2 |
| C18:3 | 0.3 | 0.1 | 0.2 | 0.4 | 0.2 |
| C20:0 | 0.3 | 0.3 | 0.3 | 0.3 | 0.3 |
| SAFA | 22.3 | 36.1 | 22.2 | 10.1 | 14.5 |
| MUFA | 62.6 | 53.1 | 66.3 | 76.3 | 76.7 |
| PUFA | 14.6 | 10.2 | 10.8 | 13.4 | 8.5 |
| Sn-2 SAFA % = SAFA on SN-2 position/(total SAFA × 3)% | 12.9% | 20.6% | 13.3% | 6.6% | 7.5% |

Example 2—Preparation of Confectionery Ink Composition

Each fat composition in Example 1 (Fat 1, Fat 2, Fat 3, Comparative Fat 1 and Comparative Fat 2) was completely melted in a stainless steel container immersed in a 55° C. water bath for at least 3 hours.

For each confectionery ink composition, a pre-mixture of 1440 gram sugar, 210 gram cocoa powder DR 74, 210 gram cocoa powder NE, 210 gram skimmed milk powder, 12 gram lecithin and 0.6 gram vanillin was prepared and kept at room temperature. 930 gram of each completely melted fat composition was then added into the pre-mixture respectively and blended.

A laboratory ball mill (W-1-S, Wiener B.V., the Netherlands) was prepared and thermostated at 55° C. with a water bath. Subsequently, each blend containing all the ingredients in Table 3 was added to the ball mill respectively and the total contents were milled at maximum speeds for 40 minutes. The ball mill was then set at minimum speed and each material was collected from the outlet of the mill into a stainless steel container respectively.

TABLE 3

Recipe of confectionery ink composition

| Ingredient | Weight (gram) | Percentage (%) |
|---|---|---|
| Sugar | 1440 | 47.80% |
| Fat composition | 930 | 30.87% |
| Cocoa powder DR 74 (Cargill Cocoa & Chocolate) | 210 | 6.97% |
| Cocoa powder NE (Cargill Cocoa & Chocolate) | 210 | 6.97% |
| Skimmed milk powder | 210 | 6.97% |
| Lecithin | 12 | 0.40% |
| Vanillin | 0.6 | 0.02% |

Each collected material was kept in stainless steel containers immersed in a water bath set at 55° C. The container was then placed into a water bath of 15° C.-16° C. and while stirring, each material was cooled to a temperature of 32° C.-35° C. Five confectionery ink compositions were then obtained (Table 4).

TABLE 4

Overview of confectionery ink compositions

| Confectionery ink composition | Ink composition 1 | Ink composition 2 | Ink composition 3 | Comparative ink composition 1 | Comparative ink composition 2 |
|---|---|---|---|---|---|
| Fat composition | Fat 1 | Fat 2 | Fat 3 | Comparative Fat 1 | Comparative Fat 2 |

Example 3—3D-Printing of Confectionery Products

Each confectionery ink composition in Example 2 was subsequently loaded into a preheated 30 mL plastic syringe (diameter of 23 mm, 40° C.). This syringe was immediately placed in a Byflow Focus 3D food printer (Byflow, The Netherlands) which was equipped with a heating element to maintain the syringe at a controlled temperature of 33-35° C. 3D-printing was initiated and model prints were made consisting of a square shape with single wall of 160 by 160 mm and 10 layers high. This predetermined pattern was made in Sketchup and translated into a G-code file by Slic3r software. Extrusion diameter of the printing nozzle was 1.6 mm and vertical printing velocity set at 15 mm/s for all layers. A single brim was printed at 10 mm from the object in the beginning in order to allow the printer to adjust the necessary force to extrude the ink out of the syringe. Layer height was set at 1.2 mm for all prints. Five 3D-printed confectionery products were then obtained respectively (Table 5).

TABLE 5

Overview of 3D-printed confectionery products

| 3D-printed confectionery product | 3D-printed product 1 | 3D-printed product 2 | 3D-printed product 3 | Comparative 3D-printed product 1 | Comparative 3D-printed product 2 |
|---|---|---|---|---|---|
| Confectionery ink composition | Ink composition 1 | Ink composition 2 | Ink composition 3 | Comparative ink composition 1 | Comparative ink composition 2 |

Example 4—Evaluation of 3D-Printed Confectionery Products

All the ink compositions have an acceptable viscosity in the extruder and are able to be extruded out of the syringe and be deposited on the platform with a constant printing speed. After printing, the weight and the height of each product were measured. The results are shown in Table 6.

TABLE 6

Height of each product after 3D-printing

| 3D-printed confectionery product | 3D-printed product 1 | 3D-printed product 2 | 3D-printed product 3 | Comparative 3D-printed product 1 | Comparative 3D-printed product 2 |
|---|---|---|---|---|---|
| Weight (g) | 22.4 | 22.9 | 23.6 | 23.7 | 23.4 |
| Height (mm) | 13 | 13 | 14 | not measurable | 4 |

Comparative 3D-printed product 1 completely lost its structure after printing due to the extreme slow crystallization. Therefore, it is not possible to measure the height of Comparative 3D-printed product 1. Further, it was observed that the structure of Comparative 3D-printed product 2 was suffering significant collapsing. Therefore, the height of Comparative 3D-printed product 2 is very low comparing to the design value, while 3D-printed products 1 to 3 have a very similar height to the design value 12 mm (1.2 mm×10 layers). The low height value is because of the object structure collapsing after printing due to the too slow solidifying behavior of the ink composition. Clearly, an ink composition of slow solidifying is less suitable for 3D printing.

All the products are set at room temperature for 30 minutes. After 30 minutes, the appearance of each 3D-printed confectionery product was evaluated. The evaluation is shown in Table 7.

TABLE 7

Appearance evaluation of 3D-printed confectionery products

| 3D-printed confectionery product | 3D-printed product 1 | 3D-printed product 2 | 3D-printed product 3 | Comparative 3D-printed product 1 | Comparative 3D-printed product 2 |
|---|---|---|---|---|---|
| Rigidness | Normal, slightly flexible | Normal, slightly flexible | Hard | Soft | Soft and liquid |

TABLE 7-continued

Appearance evaluation of 3D-printed confectionery products

| 3D-printed confectionery product | 3D-printed product 1 | 3D-printed product 2 | 3D-printed product 3 | Comparative 3D-printed product 1 | Comparative 3D-printed product 2 |
|---|---|---|---|---|---|
| Layer separation | Separation | Good separation | Good separation | Collapsing, no separation | Collapsing, no separation |
| Gloss | Average | No gloss | Good gloss | No gloss | No gloss |

All 3D-printed products 1 to 3 show acceptable rigidness. 3D-printed product 3 shows exceptional good hardness after printing. Layer separation was clearly observed in all 3D-printed products 1 to 3 while no layer separation occurred in Comparative 3D-printed products 1-2. Average gloss is observed in 3D-printed product 1 and it has been found that 3D-printed product 3 has unexpectedly good gloss.

Example 5—3D-Printing of Dyed Confectionery Products

Each fat composition in Example 1 according to the invention (Fat 1, Fat 2 and Fat 3) was provided and completely melted in a stainless steel container immersed in a 55° C. water bath for at least 3 hours.

For each confectionery ink composition, a pre-mixture of 1320 gram sugar, 300 gram skimmed milk powder, 360 gram full cream milk powder, 18 gram lecithin, 12 gram colorant and 0.6 gram vanillin was prepared and preheated to 50° C. in a thermostated cabinet. The colorants were obtained from CHR Hansen: FruitMax® Blue 1500 OS, SweetColor® Pink 1150 OSS and Mint Green 300 OS. 930 gram of each completely melted fat composition was then added into the pre-mixture respectively and blended.

A laboratory ball mill (W-1-S, Wiener B.V., the Netherlands) was prepared and thermostated at 55° C. with a water bath. Subsequently, each blend containing all the ingredients in Table 8 was added to the ball mill respectively and the total contents were milled at maximum speeds for 40 minutes. The ball mill was then set at minimum speed and each material was collected from the outlet of the mill into a stainless steel container respectively.

TABLE 8

Recipe of dyed confectionery ink composition

| Ingredient | Weight (gram) | Percentage (%) |
|---|---|---|
| Sugar | 1320 | 43.56% |
| Fat composition | 1020 | 33.66% |
| Skimmed milk powder | 300 | 9.90% |
| Full cream milk powder | 360 | 11.88% |
| Lecithin | 18 | 0.59% |
| Colorant | 12 | 0.40% |
| Vanillin | 0.6 | 0.02% |

Each collected material was kept in a stainless steel container immersed in a water bath set at 55° C. The container was then placed into a water bath of 15° C.-16° C. and, while stirring, each material was cooled to a temperature of 32° C.-35° C.

Each dyed confectionery ink composition was subsequently loaded into a preheated 30 mL plastic syringe—extruder (diameter of 23 mm, 40° C.). This syringe was immediately placed in a Byflow Focus 3D food printer (Byflow, The Netherlands) which was equipped with a heating element to maintain the syringe at a controlled temperature of 33-35° C. 3D-printing was initiated and model prints were made consisting of a square shape with single wall of 160 by 160 mm and 10 layers high. This predetermined pattern was made in Sketchup and translated into a G-code file by Slic3r software. Extrusion diameter of the printing nozzle was 1.6 mm and vertical printing velocity was set at 15 mm/s for all layers. A single brim was printed at 10 mm from the object in the beginning in order to allow the printer to adjust the necessary force to extrude the ink out of the syringe. Layer height was set at 1.2 mm for all prints.

All the obtained 3D-printed dyed confectionery products have a nice and stable structure with desirable and bright color. The products are particularly suitable for use as decoration of an edible food product.

The invention claimed is:

1. An edible confectionery ink composition for 3D printing comprising from 20% to 75% by weight of sweetener, and from 15% to 50% by weight of a fat composition, wherein the fat composition comprises:
   from 0% to 3% by weight of lauric acid; and
   from 35% to 70% by weight of saturated fatty acid;
   said percentages of acid referring to acids bound as acyl groups in glycerides in the fat composition and being based on a total weight of C8 to C24 fatty acids; and
   a percentage of saturated fatty acid on a second position of triglyceride out of total saturated fatty acid from 8.0% to 40.0%;
   and
   wherein the fat composition has:
   from 50 to 90 solid fat content at 10° C.; and
   from 30 to 75 solid fat content at 20° C.; and
   from 5 to 30 solid fat content at 30° C.; and
   from 2 to 18 solid fat content at 35° C.;
   measured on unstabilized fat according to ISO 8292-1; and
   the fat composition is a blend of interesterified palm olein with shea stearin.

2. The ink composition according to claim 1, comprising:
   from 25% to 70% by weight of sweetener; and
   from 20% to 45% by weight of the fat composition.

3. The ink composition according to claim 1, wherein the fat composition comprises:
   from 5% to 18% by weight of combined PPP, PPSt, PStSt and StStSt triglycerides; and
   from 40% to 60% by weight of combined POP, POSt and StOSt triglycerides;
   based on total triglycerides present in the composition, wherein P is palmitic acid, O is oleic acid and St is stearic acid.

4. The ink composition according to claim 1, wherein the fat composition has a weight ratio of PPP+PPSt+PStSt+StStSt: POP+POSt+StOSt triglycerides of from 0.08 to 0.45;

based on total triglycerides present in the composition, wherein P is palmitic acid, O is oleic acid and St is stearic acid.

5. The ink composition according to claim 1, wherein the fat composition comprises:
   from 0% to 2% by weight of lauric acid; and
   from 40% to 65% by weight of saturated fatty acid;
   said percentages of acid referring to acids bound as acyl groups in glycerides in the fat composition and being based on the total weight of C8 to C24 fatty acids; and
   a percentage of saturated fatty acid on the second position of triglyceride out of total saturated fatty acid from 9.0% to 38.0%.

6. The ink composition according to claim 1, wherein the fat composition has:
   from 55 to 85 solid fat content at 10° C.; and/or
   from 40 to 80 solid fat content at 15° C.; and/or
   from 35 to 65 solid fat content at 20° C.; and/or
   from 20 to 45 solid fat content at 25° C.; and/or
   from 6 to 25 solid fat content at 30° C.; and/or
   from 3 to 15 solid fat content at 35° C.;
   measured on unstabilized fat according to ISO 8292-1.

7. The ink composition according to claim 1 wherein the fat composition is a blend of interesterified palm olein with shea stearin, containing from 30% to 70% by weight of interesterified palm olein with an iodine value from 52 to 57 and 30% to 70% by weight of shea stearin.

8. The ink composition according to claim 1, further comprising one or more ingredients selected from cocoa powder, milk powder, vegetable milk powder, dairy powder, yoghurt powder, cocoa mass, vanillin, emulsifier, colorant and flavoring.

9. The ink composition according to claim 1, comprising from 5% to 25% by weight of cocoa powder.

* * * * *